(12) United States Patent
Deroo

(10) Patent No.: US 10,174,238 B2
(45) Date of Patent: Jan. 8, 2019

(54) ENVIRONMENTALLY FRIENDLY LUBRICANT FOR DRILLING PROCESSES

(71) Applicant: Earth Lubricants, LLC, Brighton, CO (US)

(72) Inventor: Brent Deroo, Greeley, CO (US)

( * ) Notice: Subject to any disclaimer, the term of this patent is extended or adjusted under 35 U.S.C. 154(b) by 0 days.

(21) Appl. No.: 15/279,986

(22) Filed: Sep. 29, 2016

(65) Prior Publication Data

US 2017/0137689 A1    May 18, 2017

Related U.S. Application Data

(60) Provisional application No. 62/256,923, filed on Nov. 18, 2015.

(51) Int. Cl.
   *C09K 8/035*    (2006.01)
   *E21B 21/06*    (2006.01)

(52) U.S. Cl.
   CPC ............ *C09K 8/035* (2013.01); *E21B 21/062* (2013.01); *C09K 2208/34* (2013.01)

(58) Field of Classification Search
   CPC .... C09K 2208/34; C09K 8/035; E21B 21/062
   USPC ................................................... 507/90–940
   See application file for complete search history.

(56) References Cited

U.S. PATENT DOCUMENTS

| | | | |
|---|---|---|---|
| 2,994,660 A * | 8/1961 | Reddie | C09K 8/36 507/131 |
| 3,791,975 A | 2/1974 | Sample et al. | |
| 5,691,285 A | 11/1997 | Coffey et al. | |
| 5,807,811 A * | 9/1998 | Malchow, Jr. | B01F 17/0021 507/128 |
| 7,648,539 B2 | 1/2010 | Wetzel | |
| 8,846,583 B2 | 9/2014 | Espagne et al. | |
| 2014/0303057 A1* | 10/2014 | Abhari | C10G 3/00 508/589 |
| 2015/0322325 A1* | 11/2015 | Amanullah | C09K 8/16 175/65 |

* cited by examiner

*Primary Examiner* — Frances Tischler
(74) *Attorney, Agent, or Firm* — Patent Law Offices of Rick Martin, P.C.

(57) ABSTRACT

Yellow grease is an inexpensive, environmentally friendly commodity that can be used as a lubricant on oil drilling sites as well as for many other applications. The present invention outlines use of yellow grease and a lubricant on drilling sites.

11 Claims, 2 Drawing Sheets

ENVIRONMENTALLY FRIENDLY LUBRICANT FOR DRILLING PROCESSES

REFERENCE TO RELATED APPLICATIONS

The present non-provisional application claims priority to U.S. Prov. App. No. 62/256,923 filed Nov. 18, 2015, which is incorporated herein by reference in its entirety.

FIELD OF INVENTION

The present invention relates to the field of oil and natural gas drilling lubricants.

BACKGROUND OF THE INVENTION

The most common drill rigs used on drilling sites are the rotary rig type as illustrated in FIG. 1. Multiple engines (power supply) 101 supply power to hoisting equipment 102 that raises and lowers the drill string or pipe 103 and rotating equipment 104 that turns the drill string and the drill bit. The power supply also drives the circulating equipment 104 or pumps drilling liquids 105 called mud down the hole into the annular space 106 to lubricate the drill string and drill bit which are rotating in the hole. This mud removes cuttings, loose bits of rock, and controls downhole pressure to prevent blowouts, and also serves to cool and lubricate the drill bit.

The conventional drill bit has three movable cones containing teeth made of tungsten carbide steel and sometimes industrial diamonds. The rotating cones are the cutting heads. The downward force on the drill bit is the result of the weight of the overhead drill stem, called collars, and drilling equipment on the derrick which can amount to thousands of pounds. The entire pipe and bit assembly rotate together in the hole.

While the bit buts the rock at the bottom of the hole, surface pumps force drilling fluids 105 such as mud down the hole through the inside of the drill pipe and out the bit. The fluid lubricates and removes cuttings. The fluid, with the cuttings, then flows out the center of the drill bit, and is forced back up the outside of the drill pipe to the surface of the ground where it is cleaned of debris and pumped back down the hole.

Drilling produces waste material including drilling mud, rock cuttings, and salt water brine (highly concentrated salt water). A reserve pond is often dug to temporarily hold the brine and drilling mud. All waste materials must be moved off site and sent to a properly licensed landfill for disposal.

SUMMARY OF THE PRIOR ART

The following documents and their synopsis are presented.
1. U.S. Pat. No. 7,648,539 (2010) to Wetzel describes a hybrid diesel fuel and method of manufacture. The fuel composes a petroleum diesel fuel mixed into biosynthetic waste or virgin oil, and a stabilizer. They hybrid fuel is 10-50% Diesel Number 1, or 2, or Farm Diesel petroleum fuels and up to 90% filtered and polished biosynthetic oil, measured by volume. The biosynthetic oil can contain all levels of common commercial vegetable and animal fats in any ratio.
2. U.S. Pat. No. 8,846,583 (2014) describes a biodegradable lubricant composition consisting in majority of fatty acid (s). The lubricant is based on a hydrocarbon mineral oil of non-aromatic oils (95-99%) and on fatty acids ($C_{16}$-$C_{22}$ monocarboxylic fatty acids, optionally in mixture with resin acids) with not more than 1% by mass aromatic oil. Mineral oils can vary from light to heavy with light oil containing shorter chain alkanes and heavier oils containing longer chain alkanes.
3. U.S. Pat. No. 3,791,975 (1974) describes a biodegradable lubricant containing either straight chain alkyl compounds of C1-C18, and straight chain ester of a fatty organic acid having C1 to C20.
4. U.S. Pat. No. 5,691,285 (1997) describes a nontoxic biodegradable lubricant composition including a nontoxic oil base such as vegetable oil, preferably coin or olive oil, and a nontoxic solvent such as ethanol, either ethyl alcohol, and/or a citrus solvent (this could be citric acid), such as terpene, or limonene.
5. DE 101012255 A1 German Patent Application: Semi-continuous production of biodegradable fatty acid ester mixtures of use e.g. as a synthetic lubricant, etc.

Waste materials from drilling sites must be moved off site and sent to a properly licensed landfill for disposal. The drilling fluid or mud is a big portion of these waste materials. Drilling fluid generally serves to cool and lubricate the drill bit, remove rock fragments or drill cuttings and transport them to the surface, counter balance pressure formation, and prevent uncased wellbores from caving in. Drilling fluids may be water-based, oil-based, or synthetic. About eighty percent of drilling fluids are water based using a base fluid of fresh or salt water. These systems may incorporate natural clays. Water based fluids may be either non-dispersed or dispersed systems. The non-dispersed system are generally simple gel-and-water systems used for tophole drilling. Natural clays are incorporated into the mud as are high- and low-weight long-chain polymers which provide viscosity and fluid-loss control. Dispersed systems use chemical dispersants to deflocculate clay particles and allow improved rheology control in higher-density muds and require addition of caustic soda to maintain a high pH.

Additives to drilling fluids include weighting materials, corrosion inhibitors, dispersants, flocculants, surfactants like fatty acids and soaps to de-foam and emulsify mud, biocides to kill bacteria and help reduce the souring of drilling mud, and fluid loss reducers such starch and organic polymers that limit loss of drilling mud to under-pressured or high-permeability formations.

It is required that all drilling fluids be non-toxic to the environment to reduce potential negative effects on the surrounding area. To this end, it is one aspect of the present invention to provide a non-toxic environmentally friendly drilling lubricant to be used in drilling mud.

A second aspect of the invention is to provide a low-cost drilling lubricant. Further, a method for producing a low-cost environmentally friendly drilling fluid is presented herein.

Yet another aspect of the present invention is to provide a drilling lubricant that is a re-used product.

Other aspects of this invention will appear from the following description and appended claims, reference being made to the accompanying drawings forming a part of this specification wherein like reference characters designate corresponding parts in the several views.

Figure 1:
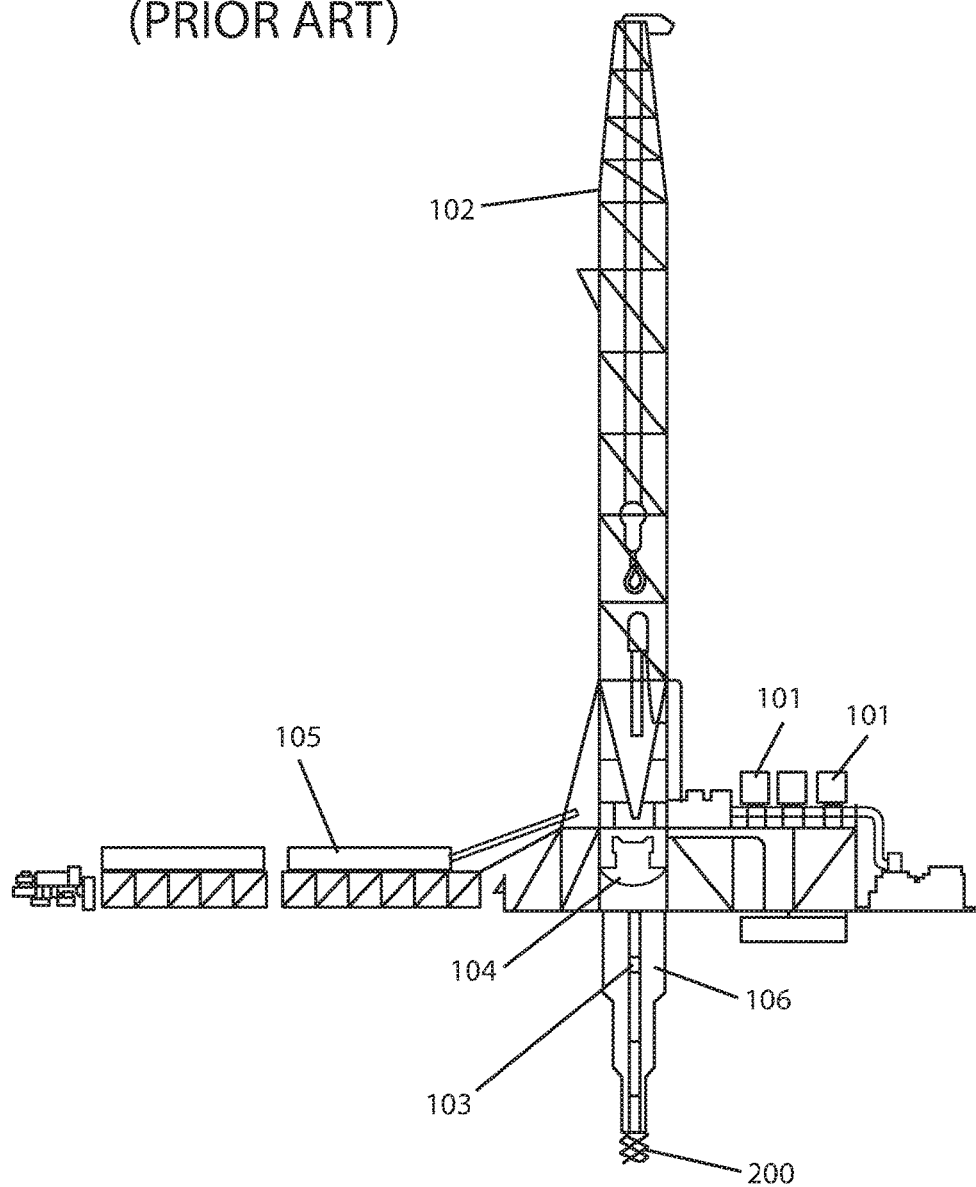
FIG. 1. is a prior art illustration of a drilling rig.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Yellow grease is a product produced from the recycling of used cooking oil. Used cooking oil and yellow grease are collected from restaurants and other food industry sites and is readily available as a commodity product. It comes from the vegetable oil restaurants and industries use in their deep fryers and food processing. Yellow grease is also produced as a by-product of the animal rendering process. Currently yellow grease is utilized as a high energy additive in various livestock rations to increase the calories animals ingest, in the manufacture of oleo chemicals industry to manufacture soap, make-up, paint, rubber, and detergents. Further, yellow grease may be used to produce biofuel. There are two types of waste oil from food preparation. The cleanest is the cooking oil or waste vegetable oil from frying processes and is known as yellow grease. The second is "trap grease" or brown grease. The trap grease is used to produce biofuel and the waste oil or yellow grease and is sold at about nineteen to thirty dollars/cwt (100 pounds), depending on the market and location. A challenge for biofuel production is high free fatty acids (FFA) in the grease products. The FFAs form soaps instead of biodiesel. Generally yellow grease is less than fifteen percent FFA, while brown grease will contain greater than fifteen percent.

Yellow grease is non-toxic, non-hazardous, non-flammable, and stable. No special equipment is needed to handle the product. It is ninety percent fatty acids including mainly palmitic acid, palmitoleic acid, steric acid, oleic acid, linoleic acid, linolenic acid, and small percentages, less than one percent, lauric acid, myrsitic acid, myristoleic acid, pentadecanoic acid, archidic acid, and behenic acid. The Extractable Petroleum Hydrocarbons of yellow grease were analyzed via EPA Method 8015. Results showed 32,000 mg/kg C10-C28 and 2500 mg/kg C28-C36.

The need for lubricant in drilling fluid or mud arrives from several issues. First heat is generated from mechanical and hydraulic forces at the bit when the drill string rotates and rubs against casing and wellbore. The lubricant cools and transfers heat away from the source and lowers the temperature at the bottom hole. If this did not occur, the bit, drill string, and mud motors would fail more rapidly. Lubrication is based on the coefficient of friction. Oil and synthetic-based muds generally lubricate better than water-based mud (but the latter can be improved by the addition of lubricants). The amount of lubrication provided by a drilling fluid depends on the type & quantity of drill solids and weight materials and chemical composition of the system. Poor lubrication causes high torque and drag, heat checking of the drill string, but these problems are also caused by key seating, poor hole cleaning and incorrect bottom hole assemblies design. Drilling fluids also support a portion of the drill-string or casing through buoyancy, thus reducing the hook load on the derrick. Weight that the derrick can support is limited by mechanical capacity. Thus increasing the depth the weight of the drill-string and casing increase. When running a long, heavy string or casing, buoyancy makes possible to run casing strings whose weight exceeds a rig's hook load capacity.

Figure 2:
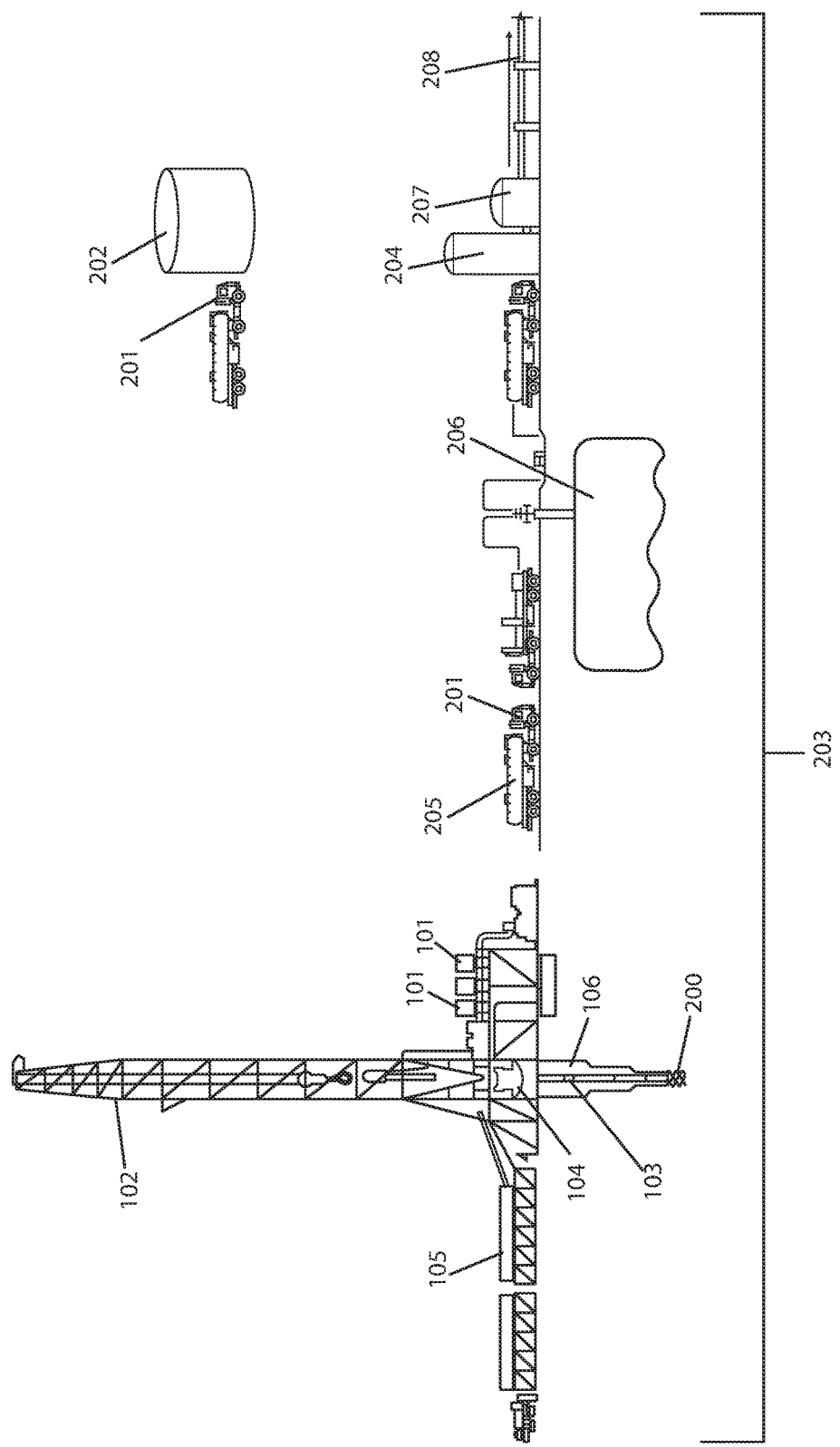
FIG. 2 is an illustration of a process for re-use of yellow grease as a drilling lubricant, a process of the present invention.

The present invention is a lubricant, yellow grease, and process for the re-use of yellow grease as a lubricant in a drilling process. As shown in FIG. 2, the contained yellow grease 202 is transported as by truck 201 from restaurants and industrial sites, or having been bought as a commodity product, to a drilling site 203 where it can be mixed into the drilling fluid or mud 204 in a truck 205 or in another vessel and pumped into the drill hole as shown in FIG. 1. The reclaimed material can be stored on-site in a pond 206, or a tank 207, and then loaded into a truck 201 or transferred to an offsite facility for disposal 208.

As a non-limiting example the yellow grease is filtered to remove food matter or other impurities. In addition, the yellow grease may be dewatered. As an example the yellow grease may comprise between twenty and eighty percent of the drilling mud by weight, or even thirty to seventy percent by weight, or even further forty to sixty percent by weight. As a further example, about four to eight totes of yellow grease weighing 2,060 pounds each may be added to six to ten totes of drilling fluid also weighing 2,060 pounds each. In a further example, six totes of yellow grease may be added to eight totes of drilling mud. This ratio may vary for different reasons including type of rock at the drilling site. For instance, a hard granite rock may require more lubricant.

Other ingredients may be added to the yellow grease to increase usability. These may include acids, such as citric acid, or other non-toxic acids or other components that may lower freezing temperature of the solution or impart other useful properties. Citric acid may be used for example added from 0.1% to 10% by weight of the yellow grease. Or the citric acid may be added at 0.2% to 5%, or at 0.5-2% weight. In a further example the citric acid may be added at 1% by weight. Further some water may be left in the yellow grease or water may be added back to the filtered and dewatered yellow grease at 0.1 to 10% by weight, or 0.2 to 5%, or at 1% by weight.

In addition to the foregoing the inventors have established that yellow grease is applicable to other lubrication needs. For instance cutting fluid is a type of coolant and lubricant designed specifically for metalworking processes, such as machining and stamping. There are various kinds of cutting fluids, which include oils, oil-water emulsions, pastes, gels, aerosols (mists), and air or other gases. They may be made from petroleum distillates, animal fats, plant oils, water and air, or other raw ingredients. Depending on context and on which type of cutting fluid is being considered, it may be referred to as cutting fluid, cutting oil, cutting compound, coolant, or lubricant.

Most metalworking and machining processes can benefit from the use of cutting fluid, depending on the material. Common exceptions to this are cast iron and brass, which are machined dry. The properties that are sought after in a good cutting fluid are the ability to: keep the workpiece at a stable temperature (critical when working to close tolerances), very warm is okay, but extremely hot or alternating hot-and-cold are avoided; maximize the life of the cutting tip by lubricating the working edge and reducing tip welding; ensure safety for the people handling it (toxicity, bacteria, fungi) and for the environment upon disposal; and prevent rust on machine parts and cutters.

Functions of yellow grease in this application may include cooling and metal cutting. Metal cutting generates heat due to friction and energy lost deforming the material. The surrounding air has low thermal conductivity (conducts heat poorly) meaning it is a poor coolant. Ambient air cooling is sometimes adequate for light cuts and low duty cycles typical of maintenance, repair and operations (MRO) or hobbyist work. Production work requires heavy cutting over long time periods and typically produces more heat than air cooling can remove. Rather than pausing production while the tool cools, using liquid coolant removes significantly more heat more rapidly, and can also speed cutting and reduce friction and tool wear. However, it is not just the tool which heats up but also the work surface. Excessive temperature in the tool or work surface can ruin the temper of both, soften either to the point of uselessness or failure, burn adjacent material, create unwanted thermal expansion or lead to unwanted chemical reactions such as oxidation.

Besides cooling, cutting fluids also aid the cutting process by lubricating the interface between the tool's cutting edge and the chip. By preventing friction at this interface, some of the heat generation is prevented. This lubrication also helps prevent the chip from being welded onto the tool, which interferes with subsequent cutting. Extreme pressure additives are often added to cutting fluids to further reduce tool wear.

Delivery methods for yellow grease in this application may include but would not be limited to the following: any conceivable method of applying cutting fluid (e.g., flooding, spraying, dripping, misting, brushing) can be used, with the best choice depending on the application and the equipment available. For many metal cutting applications the ideal has long been high-pressure, high-volume pumping to force a stream of liquid (usually an oil-water emulsion) directly into the tool-chip interface, with walls around the machine to contain the splatter and a sump to catch, filter, and recirculate the fluid. This type of system is commonly employed, especially in manufacturing. It is often not a practical option for MRO or hobbyist metal cutting, where smaller, simpler machine tools are used. Fortunately, it is also not necessary in those applications, where heavy cuts, aggressive speeds and feeds, and constant, all-day cutting are not vital. As technology continually advances, the flooding paradigm is no longer always the clear winner. It has been complemented since the 2000s by new permutations of liquid, aerosol, and gas delivery, such as minimum quantity lubrication and through-the-tool-tip cryogenic cooling (detailed below).

Through-tool coolant systems, also known as through-spindle coolant systems, are systems plumbed to deliver coolant through passages inside the spindle and through the tool, directly to the cutting interface. Many of these are also high-pressure coolant systems, in which the operating pressure can be hundreds to several thousand psi (1 to 30 MPa)—pressures comparable to those used in hydraulic circuits. High-pressure through-spindle coolant systems require rotary unions that can withstand these pressures. Drill bits and endmills tailored for this use have small holes at the lips where the coolant shoots out. Various types of gun drills also use similar arrangements.

Yet another application for yellow grease is as a concrete release agent in the concrete construction industry. Form release agents prevent the adhesion of freshly placed concrete to the forming surface, usually plywood, overlaid plywood, steel or aluminum. In this application, there are two types of release agents available: barrier and reactive. Barrier release agents prevent adhesion by the development of a physical film or barrier between the forming surface and the concrete.

Reactive release agents are chemically active and work by the process of a chemical reaction between the release agent and the free limes available in fresh concrete. A soapy film is created which prevents adhesion. Because it is a chemically reactive process, there is generally little to no residue or unreacted product left on the forming surface or concrete which provides for a cleaner process. Therefore, yellow grease serves as a release agent. It is applied to the forming surface by spraying.

Even further, the yellow grease described herein is used as a dust control agent. Most governmental EPAs, including the United States Environmental Protection Agency (EPA) mandate that facilities that generate dust, minimize or mitigate the production of dust in their operation. The most frequent dust control violations occur at new residential housing developments in urban areas. United States Federal law requires that construction sites obtain permits to conduct earth moving, clearing of areas, to include plans to control dust emissions when the work is being carried out. Control measures include such simple practices as spraying construction and demolition sites with water, and preventing the tracking of dust onto adjacent roads.

Some of the issues include: reducing dust related health risks that include allergic reactions, pneumonia and asthmatic attacks; improving visibility and road safety; providing cleaner air, cleaner vehicles and cleaner homes and promoting better health; improving crop productivity in agriculture; reducing vehicle maintenance costs by lowering the levels of dust that clog filters, bearings and machinery; reducing driver fatigue, maintenance on suspension systems and improving fuel economy; and increasing cumulative effect—each new application builds on previous residuals reducing re-application rate while improving performance.

US federal laws require dust control on sources such as vacant lots, unpaved parking lots, and unpaved roads. Dust in such places may be suppressed by mechanical methods, including paving or laying down gravel, or stabilizing the surface with water, vegetable oils or other dust suppressants, or by using water misters to suppress dust that is already airborne. Therefore, yellow grease serves as a perfect dust control agent.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A method for reuse of a yellow grease formed from frying foods at a restaurant, the method comprising the steps of:
  a. forming the yellow grease from a mixture of a vegetable oil and a grease from an animal rendering process;
  b. processing the yellow grease to having less than about fifteen percent free fatty acids;
  c. filtering the yellow grease to remove food matter and impurities;
  d. dewatering the yellow grease;
  e. transporting the yellow grease to a drill site;
  f. mixing the yellow grease with a drill fluid to form a drill fluid-yellow grease mixture;
  g. pumping the drill fluid-yellow grease mixture into the drill hole; and
  h. transferring heat away from a drill bit in the drill hole.

2. The method of claim 1 further comprising:
  a. adding city water to the dewatered yellow grease.

3. The method of claim 2, further comprising the step of adding a temperature modifier at a concentration of about at least 0.1% to about 10%.

4. The method of claim 1, wherein the drill fluid-yellow grease mixture contains at least twenty percent yellow grease.

5. The method of claim 1, wherein the drill fluid-yellow grease mixture contains at least thirty percent yellow grease.

6. The method of claim 1, wherein the drill fluid-yellow grease mixture contains at least forty percent yellow grease.

7. The method of claim 1, wherein the drill fluid-yellow grease mixture contains at least fifty percent yellow grease.

8. The method of claim 1, wherein the drill fluid-yellow grease mixture contains at least sixty percent yellow grease.

9. The method of claim 1, wherein the drill fluid-yellow grease mixture contains at least eighty percent yellow grease.

10. The method of claim 1 further comprising the step of forming the yellow grease having about ninety percent fatty acids.

11. The method of claim 10 further comprising the step of forming the fatty acids selected from the group consisting of palmitic acid, palmitoleic acid, steric acid, oleic acid, linoleic acid, linolenic acid, lauric acid, myrsitic acid, myristoleic acid, pentadecanoic acid, archidic acid, and behenic acid.

\* \* \* \* \*